US011558912B2

(12) United States Patent
Alam et al.

(10) Patent No.: US 11,558,912 B2
(45) Date of Patent: Jan. 17, 2023

(54) METHODS, SYSTEMS AND COMPUTER PROGRAMS FOR IMPROVING DATA THROUGHPUT VIA BACKHAUL SHARING

(71) Applicant: AT&T Mobility II LLC, Atlanta, GA (US)

(72) Inventors: Iftekhar Alam, Roswell, GA (US); Ming-Ju Ho, Alpharetta, GA (US); Alexander Viox, Atlanta, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 2 days.

(21) Appl. No.: 16/742,298

(22) Filed: Jan. 14, 2020

(65) Prior Publication Data

US 2021/0219358 A1 Jul. 15, 2021

(51) Int. Cl.
*H04W 76/12* (2018.01)
*H04B 7/06* (2006.01)
*H04L 43/0882* (2022.01)
*H04L 43/0894* (2022.01)

(52) U.S. Cl.
CPC .......... *H04W 76/12* (2018.02); *H04B 7/0617* (2013.01); *H04L 43/0882* (2013.01); *H04L 43/0894* (2013.01)

(58) Field of Classification Search
CPC ............. H04W 76/12; H04W 28/0812; H04W 28/0835; H04W 28/0958; H04W 36/12; H04W 76/22; H04W 92/20; H04W 36/22; H04B 7/0617; H04L 43/0882; H04L 43/0894; H04L 43/16
See application file for complete search history.

(56) References Cited

U.S. PATENT DOCUMENTS

| 9,088,988 B1* | 7/2015 | Park | H04L 5/0064 |
| 2012/0063383 A1* | 3/2012 | Barbieri | H04W 72/082 |
| | | | 370/315 |
| 2016/0057679 A1* | 2/2016 | Werner | H04W 52/04 |
| | | | 455/444 |

(Continued)

FOREIGN PATENT DOCUMENTS

EP 2884797 A1 * 6/2015 ............ H04W 28/22

OTHER PUBLICATIONS

IEEE: Distributed Optimization of Multi-Cell Uplink Co-operation with Backhaul Constraints; Shirish Nagaraj, Michael L. Honig & Khalid Zeineddine. (Year: 2015).*

(Continued)

*Primary Examiner* — Mohammed S Chowdhury
(74) *Attorney, Agent, or Firm* — Guntin & Gust, PLC; Andrew Gust

(57) ABSTRACT

Improvement of data throughput via backhaul sharing is accomplished by accessing a cell site servicing data transmission at a first data rate and a connected backhaul network having a backhaul data rate. A determination of whether the first data rate exceeds the backhaul data rate is made and an excess data rate is determined. When the first data rate exceeds the backhaul data rate a neighboring cell site having a second backhaul networks is accessed. A determination is made of how much additional capacity the second backhaul network can handle. When the neighboring cell site can handle the excess data rate backhaul sharing using beamforming is initiated.

20 Claims, 8 Drawing Sheets

(56) References Cited

U.S. PATENT DOCUMENTS

| | | | | |
|---|---|---|---|---|
| 2016/0128023 A1* | 5/2016 | Gustavsson | .......... | H04B 7/0413 |
| | | | | 370/329 |
| 2016/0262072 A1* | 9/2016 | Watanabe | ............. | H04L 47/125 |
| 2016/0337916 A1* | 11/2016 | Deenoo | ............. | H04W 36/0088 |
| 2017/0063435 A1* | 3/2017 | Christensson | .... | H04W 28/0236 |
| 2017/0303165 A1* | 10/2017 | Adams | ................... | H04L 43/16 |
| 2018/0279192 A1* | 9/2018 | Raissinia | ............. | H04W 36/38 |

OTHER PUBLICATIONS

IEEE: Coordinated Beamforming Scheme for Heterogeneous Networks with Band-limited Backhaul Constraint; Fasheng Zhou1, Gaoyong Luo1, Lisheng Fan1, Jie Tang (Year: 2017).*

3GPP TR 38.874; Technical Specification Group Radio Access Network;NR: Study on Integrated Access and Backhaul (Release 16) (Year: 2018).*

3GPP TSG-RAN3 Meeting #106; R3-196402 Reno, NV, USA, Nov. 18-22, 2019. (Year: 2019).*

\* cited by examiner

METHODS, SYSTEMS AND COMPUTER PROGRAMS FOR IMPROVING DATA THROUGHPUT VIA BACKHAUL SHARING

TECHNICAL FIELD

The present disclosure relates to wireless communication networks. More particularly, the disclosure relates to a method, system, and computer program for improving data throughput via backhaul sharing.

BACKGROUND

Telecommunication networks may conceptually be divided into three parts, the Radio Access Network (RAN), the core network, and the backhaul network. The RAN provides services to User Equipment (UEs). The core network is a central part of the telecommunication network and provides telephony and data communication services (among other) to the users who are connected by the RAN. The backhaul network connects the RAN air interfaces at small and macro cell sites to core networks that are connected to remote data centers serving up content and applications. A backhaul may include wired, fiber optic and wireless components. The backhaul network is an expensive part of wireless cells and has to be affordable to provide competitive data plans.

Historically the limiting factor on speed and reliability of a cell site has been the air interface. In recent years, mobility cell site air interface performance has been improved significantly via new technology. Presently the limiting factor on a cell site's performance and reliability is often the backhaul transport. Mobility network peak speed and reliability is imperative in today's competitive landscape. Most of the time, to achieve higher speeds and reliability a significant amount of time and capital must be invested to match the capabilities of the air interface and customer demands, especially in rural areas.

Today many mobility cell sites are over capacity and require time and capital-intensive projects to upgrade the backhaul to achieve greater speeds. At the same time many sites are only connected via one type of backhaul limiting redundancy and making each site vulnerable to backhaul disruptions such as wildfires, storms, or other accidents.

There is a need to address the problem of expensive and time-consuming backhaul upgrades on each cell site. Additionally, there is a need to address the lack of backhaul redundancy, presenting vulnerability of each site to lose connection if the only backhaul connection is lost.

SUMMARY

One general aspect includes a method including accessing a first cell site that is able to service a data transmission having a first data rate where the first cell site is connected to a first backhaul network having a first backhaul data rate. The method also includes determining if the first data rate exceeds the first backhaul data rate, determining an excess data rate including an amount that the first data rate exceeds the first backhaul data rate. When the first data rate exceeds the first backhaul data rate coordinating with a neighboring cell site having a second backhaul network to determine how much additional capacity the second backhaul network can handle based on availability of the second backhaul network and beamforming conditions between the first cell site and the neighboring cell site. When the neighboring cell site can handle the excess data rate initiating backhaul sharing using beamforming.

Implementations may include one or more of the following features. The method where coordination is handled via an X2 interface. The method where the accessing the first cell site includes accessing an antenna array that supports multi-user beamforming. The method where initiating backhaul sharing includes transmitting a portion of the data transmission to the neighboring cell site using beamforming transmission. The method further including using the first backhaul network when the second backhaul network cannot handle the excess data rate. The method where further including coordinating with a plurality of neighboring sites when the first data rate exceeds the first backhaul data rate. The method where the first backhaul data rate is zero, and the data transmission is distributed among the plurality of neighboring sites using beamforming.

One general aspect includes a system including a first cell site having a first antenna array capable of transmitting beam forming transmissions and a first backhaul network associated with the first cell site capable of transmitting backhaul data at a first backhaul data rate. A second cell site having a second antenna array capable of transmitting beam forming transmissions and a second backhaul network associated with the second cell site capable of transmitting backhaul data at a second backhaul data rate. The system further including a user equipment that transmits a data transmission to the first cell site at a first data rate. The system also includes a processor and a non-volatile computer memory for storing computer instruction coupled to the processor, where the processor, responsive to executing the computer instructions, performs operations including: accessing the first cell site; determining if the first data rate exceeds the first backhaul data rate; determining an excess data rate including an amount that the first data rate exceeds the first backhaul data rate; when the first data rate exceeds the first backhaul data rate then coordinating with the second cell site to determine how much additional capacity the second backhaul network can handle based on availability of the second backhaul network and beamforming conditions between the first cell site and the second cell site; and when the second cell site can handle the excess data rate, initiating backhaul sharing using beamforming.

Implementations may include one or more of the following features. The system where the first antenna array supports multi-user beamforming. The system where the second cell site is configured to act as a user equipment and receive a beamforming transmission. The system where coordinating with a neighboring cell site having a second backhaul network to determine how much additional capacity the second backhaul network can handle includes coordinating via an X2 interface. The system herein the operations performed by the processor further include distributing the data transmission among the plurality of neighboring cell sites when the first backhaul data rate is zero. The system where the operations performed by the processor further include coordinating with a plurality of neighboring sites when the first data rate exceeds the first backhaul data rate. The system further including a plurality of neighboring cell sites each having an antenna array capable of transmitting beam forming transmissions.

One general aspect includes a non-transitory, tangible computer-readable medium having computer-executable instructions stored thereon which, when executed by a computer, cause the computer to perform a method for improving data throughput via backhaul sharing. The method implemented includes accessing a first cell site that is able to service a data transmission having a first data rate where the first cell site is connected to a first backhaul network having a first backhaul data rate. The method implemented further includes determining if the first data rate exceeds the first backhaul data rate, and determining an excess data rate including an amount that the first data rate exceeds the first backhaul data rate. When the first data rate exceeds the first backhaul data rate then the method includes coordinating with a neighboring cell site having a second backhaul network to determine how much additional capacity the second backhaul network can handle based on availability of the second backhaul network and beamforming conditions between the first cell site and the neighboring cell site. The method implemented further includes initiating backhaul sharing using beamforming when the neighboring cell site can handle the excess data rate.

DETAILED DESCRIPTION OF ILLUSTRATIVE EMBODIMENTS

Figure 1:
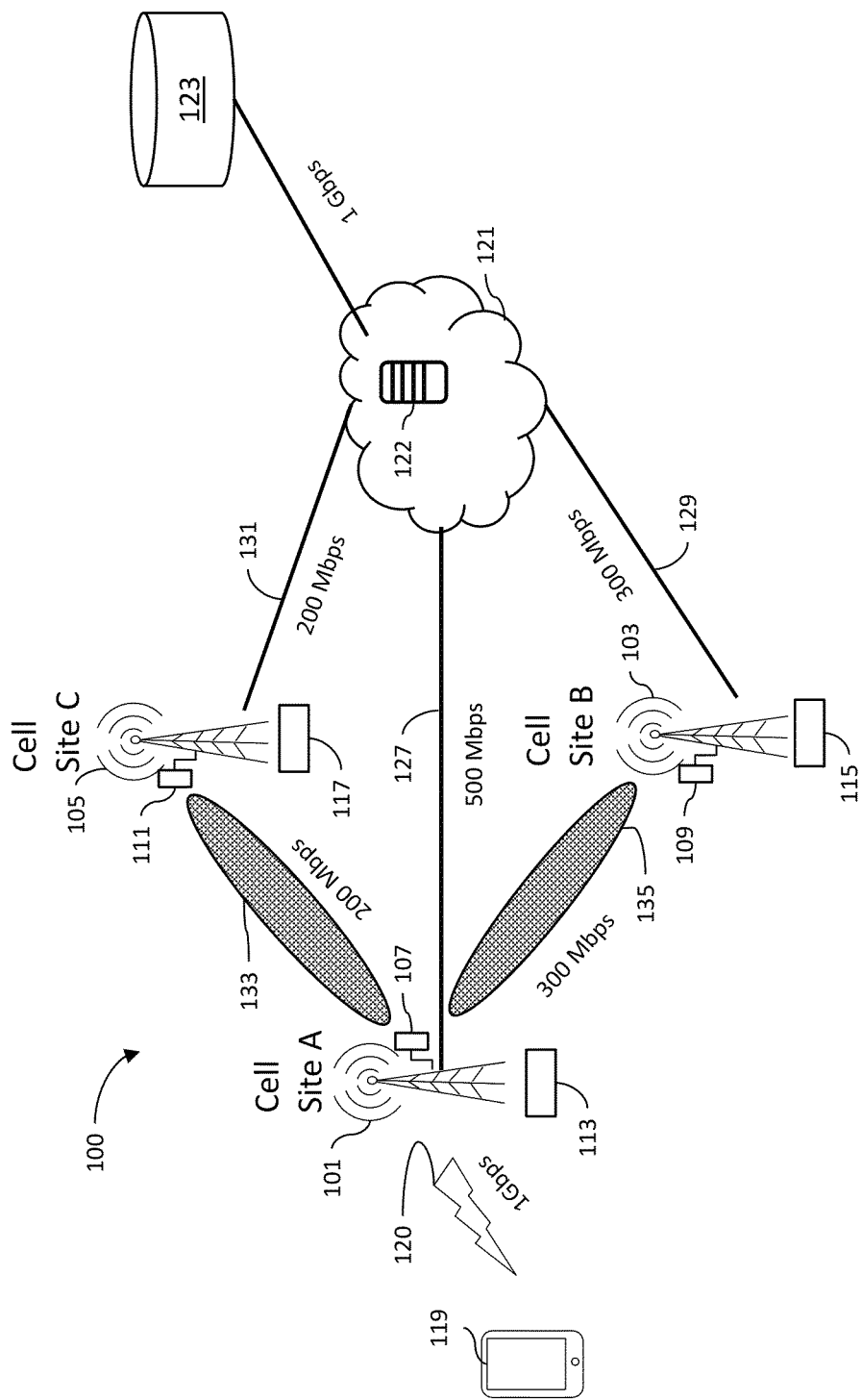
FIG. 1 is a schematic representation of the system architecture for a system for improving data throughput via backhaul sharing.

FIG. 1 is a schematic representation of the system architecture for a backhaul sharing system 100 for improving data throughput via backhaul sharing using multi-user beamforming ("MU-MIMO"). The backhaul sharing system 100 includes a plurality of cell sites, for example three cell sites are illustrated in FIG. 1, Cell Site A 101, Cell Site B 103 and cell Site C 105. A Cell Site refers to the antenna equipment and ground equipment that is used to transmit cell phone signals to and from a user equipment back to the receiver. This equipment is likely to include transmitter/receivers, GPS, backup power sources, eNodeB or base transceiver station (BTS), and more. Associated with Cell Site A 101 is beamforming antenna array 107 that enables beamforming technology, Similarly, beamforming antenna array 109 may be provided to Cell Site B 103 and beamforming antenna array 111 may be provided to Cell Site C 105. Beamforming is a technique that focuses a wireless signal towards a specific receiving device, rather than having the signal spread in all directions from a broadcast antenna. The resulting more direct connection is faster and more reliable than it would be without beamforming. This is accomplished by combining elements in an antenna array in such a way that signals at particular angles experience constructive interference while others experience destructive interference. One technique for doing this involves having multiple antennas in close proximity, all broadcasting the same signal at slightly different times. The overlapping waves will produce interference that in some areas is constructive (it makes the signal stronger) and in other areas is destructive (it makes the signal weaker, or undetectable). If executed correctly, this beamforming process can focus a signal to the desired location. Beamforming can be used at both the transmitting and receiving ends in order to achieve spatial selectivity. The improvement compared with omnidirectional reception/transmission is known as the directivity of the array. Beamforming antenna array 107, beamforming antenna array 109 and beamforming antenna array 111 may comprise full dimension multiple input multiple output (FD-MIMO) or Massive MIMO antennas that will support multi-user beamforming (MU-MIMO). The proposed idea is to take advantage of this technology and enable communication between cell sites for backhaul sharing.

Associated with each Cell site may be a eNodeB. So, for example Cell Site A 101, may include eNodeB 113, Cell Site B 103 may include eNodeB 115 and Cell Site C 105 may include eNodeB 117. In the example in FIG. 1 a user equipment (UE) 119 may be connected to Cell Site A 101 though a standard RAN air interface 120. The backhaul sharing system 100 includes a core network 121 having a core server 122. The core network may be connected to an external network 123. Cell Site A 101 may be connected to the core network 121 through a backhaul network 127. Similarly, Cell Site B 103 may be connected to the core network 121 through backhaul network 129 and Cell Site C 105 may be connected to the core network 121 through backhaul network 131.

The eNodeBs 113, 115 and 117 may be configured to communicate voice, data, and control signals between User Equipment (e.g. UE 119) and to other network destinations. The eNodeB may act as a bridge (e.g., layer 2 bridge) between the User Equipment and the core network 121 by serving as the termination point of all radio protocols towards the User Equipment and relaying voice (e.g., VoIP, etc.), data, and control signals to network components in the core network 121. The eNodeB may be configured to perform various radio resource management operations (such as controlling the usage of radio interfaces, allocating resources based on requests, prioritizing and scheduling traffic according to various quality of server (QoS) requirements, monitoring the usage of network resources, etc.) and other processing functions such as determination of backhaul network capacity and the initiation of backhaul sharing using beamforming. In an embodiment a separate processor at the Cell Site may be used to provide the other processing functions.

In the example of FIG. 1, Cell Site A 101 may be able to support 1 billion bits per second (1 Gbps) via the air interface 120 with UE 119. However, backhaul network 127 may be limited to only 500 million bits per second (Mbps). In this example Cell Site A 101 will transmit data at 500 Mbps via its own backhaul and initiate beamforming communication with Cell site B 103 and Cell Site C 105 and request 500 Mbps backhaul capacity. If Cell Site B 103 and Cell Site C 105 have unused capacity (e.g. 300 Mbps of unused capacity for Cell Site B and 200 Mbps of unused capacity for Cell Site C 105) and if beamforming transmission conditions (i.e. good RF conditions) are met, Cell Site B 103 and Cell Site C 105 will accept the request. Upon acceptance of the request Cell Site B 103 and Cell Site C 105 will initiate transmissions through their respective backhaul networks. The beamforming communication between cell sites can be coordinated and controlled via the X2 interface. The X2 interface is the signaling interface between eNodeBs of different Cell Sites.

One key benefit of the backhaul sharing system 100 is to provide a quick and inexpensive solution for throughput improvement. By utilizing the unused backhaul capacity of neighboring sites one can achieve higher speeds without making expensive and time-consuming backhaul upgrades. Besides improving throughput (most likely in for urban/suburban sites), the proposed solution can provide backhaul redundancy. In the example above, if the backhaul for Cell Site A 101 is down, the traffic can still be carried by Cell Site B 103 and Cell Site C 105. While the repairs are being done or the backhaul is being upgraded, the site doesn't have to be taken down. The site can remain on air and carry traffic via backhaul from neighboring sites.

Figure 2:
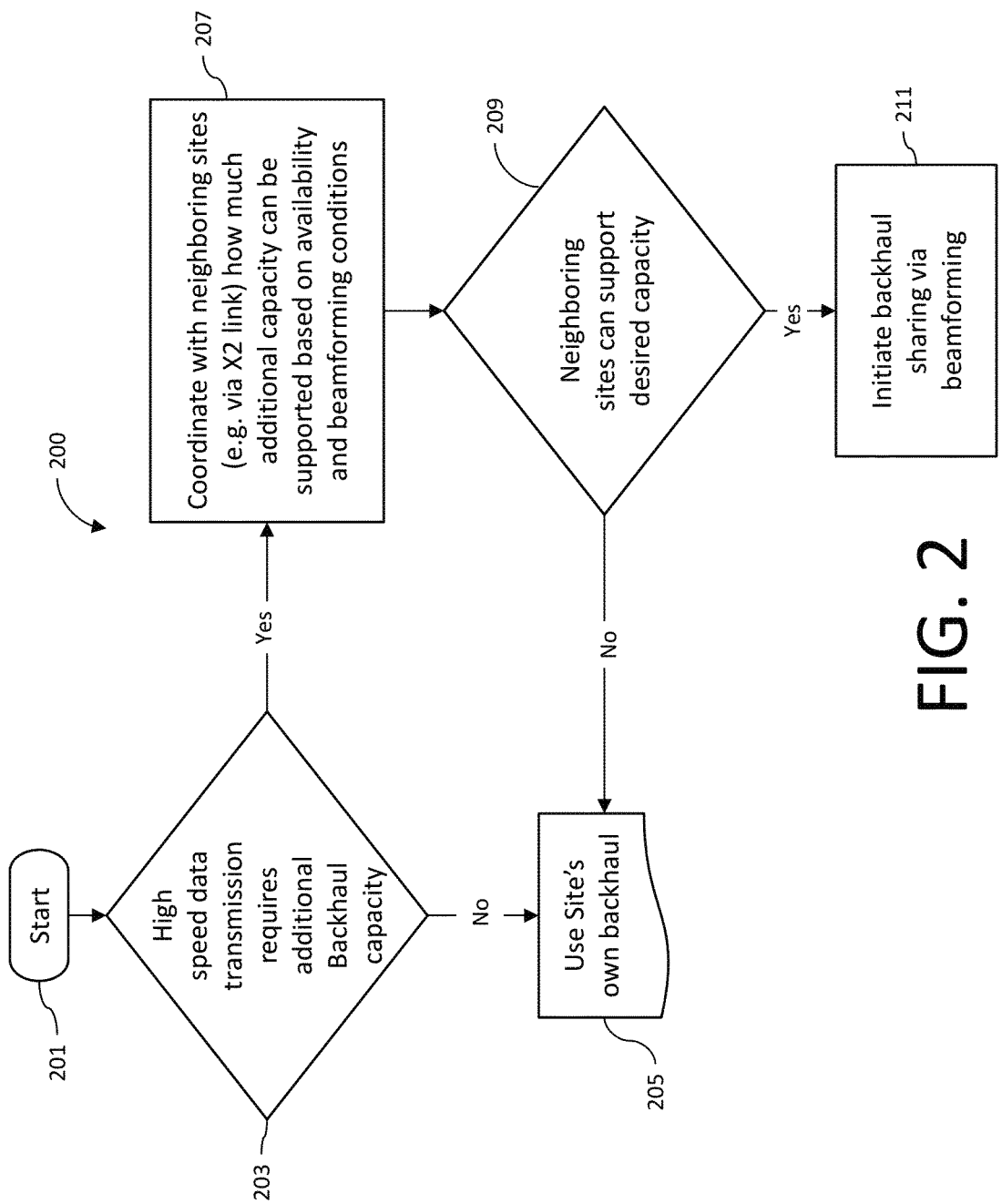
FIG. 2 is a flowchart for a method for improving data throughput via backhaul sharing.

Illustrated in FIG. 2 is a flowchart for a method 200 for improving data throughput via backhaul sharing.

In step 201 a first cell site initiates data transmission from an UE to a RAN.

In step 203 a determination is made about whether the first cell site requires additional backhaul capacity. This determination may be performed at the eNodeB associated with the cell site or by a processor at the cell site.

If the data transmission does not require additional backhaul capacity then in step 205 the method 200 initiates transmission of data through the first cell site backhaul network.

If the data transmission requires additional backhaul capacity then in step 207 the first cell site coordinates with neighboring cell sites (e.g. via X2 interface) to determine how much additional capacity can be supported by the backhaul networks of the neighboring cell sites based on availability and beamforming conditions.

Upon determining how much additional capacity can be supported by the backhaul networks of the neighboring cell sites, in step 209 the method 200 determines whether the backhaul networks of the neighboring cell sites can support the desired capacity. This determination may be made at the eNodeB or at a separate processor.

If the backhaul networks of the neighboring cell sites cannot support the desired capacity then in step 205 instructions are provided to the first cell site to use its own backhaul networks for the data transmission.

If the backhaul networks of the neighboring Cell Sites can support the desired capacity then in step 211 the method 200 initiates backhaul sharing using beamforming.

Figure 3:
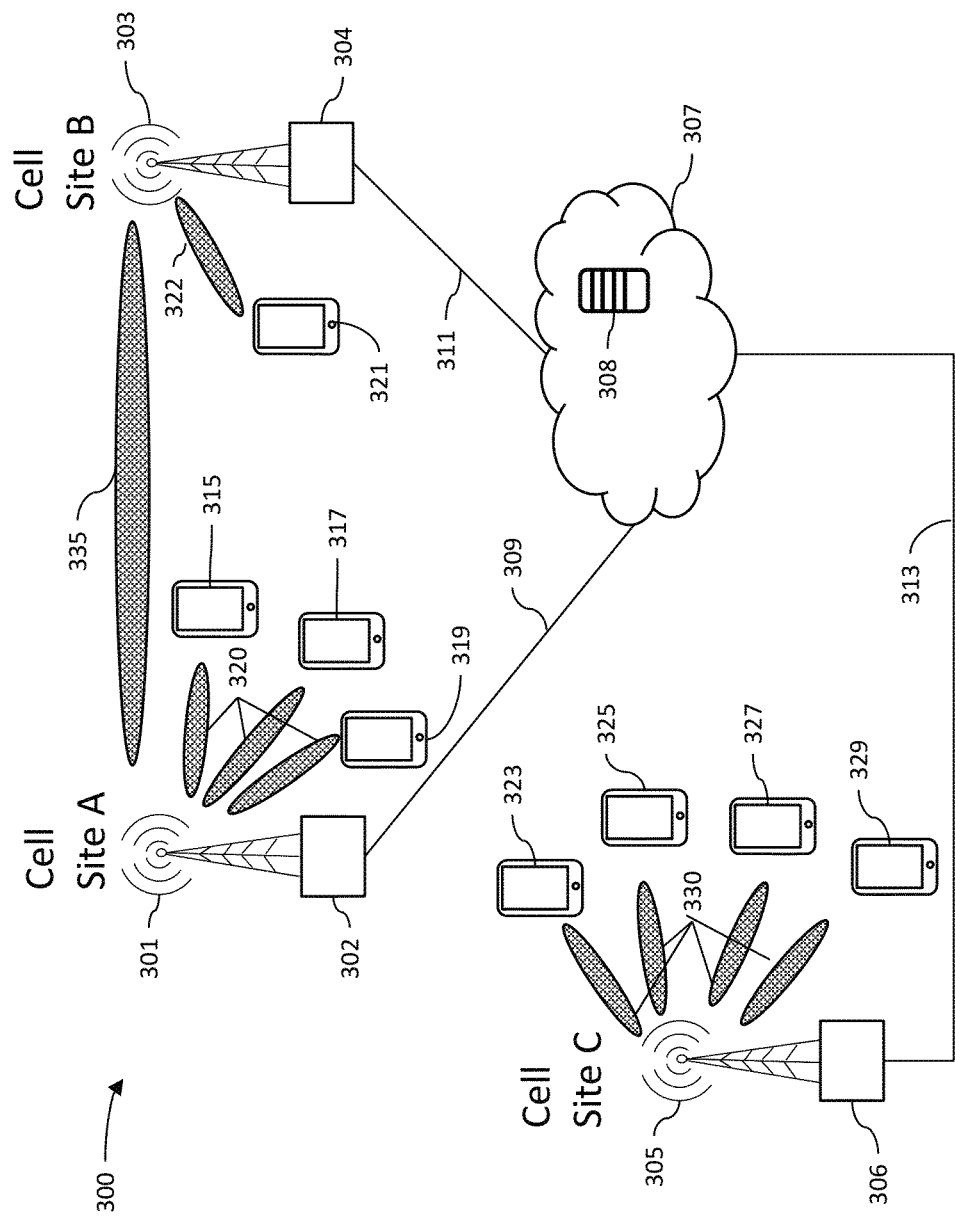
FIG. 3 is a schematic representation of a system for improving data speed via backhaul sharing.

Illustrated in FIG. 3 is a schematic representation of a system 300 for improving data speed through backhaul sharing. The system 300 includes a cell site A 301 with an associated eNodeB 302, a cell site B 303 with an associated eNodeB 304 and a cell site C 305 with an associated eNodeB 306. Cell site A 301, cell site B 303 and cell site C 305 are provided with beamforming capability. Cell site A 301, cell site B 303 and cell site C 305 are connected to core network 307 (that includes a server 308) through backhaul network 309, backhaul network 311 and backhaul network 313 respectively. Cell Site A 301 may support a plurality of UEs such as UE 315, UE 317 and UE 319 through standard wireless transmissions 320. Cell site B may support a plurality of UEs such as UE 321 through standard wireless transmissions 322. Cell site C 305 may support a plurality of UEs such as UE 323, UE 325, UE 327 and UE 329 through standard wireless transmissions 330.

In high traffic conditions backhaul gets congested resulting in poor data speed for the customers. When backhaul sharing is implemented, additional backhaul capacity is available and therefore users can experience improved peak data speeds even in high traffic conditions. Congested backhaul contributes to degradation in customer experience. With backhaul sharing customers will see improved data speeds and fewer dropped calls resulting in an overall improvement in customer experience and reduction in churn. Backhaul sharing using system 300 will enable a network operator to delay or in some cases completely avoid costly transport upgrades. Sharing backhaul will allow transport capacity to be utilized more efficiently and peak speeds can be improved without investing more in the network upgrades.

The system 300 for improving data speed via backhaul sharing would operate as follows. In the example of FIG. 3, cell site A 301 may experience high traffic and data speeds resulting in degradation due to backhaul 309 becoming congested resulting in a degraded customer experience. Cell site A 301 may notify network server 307 via X2 that its backhaul is becoming congested. Cell site B 303 and cell site C 305 may receive notifications from the core network 307 warning them of a nearby site (cell site A 301) becoming congested. Cell site B 303 and cell site C 305 check the current utilization and forecasted utilization to determine the amount of backhaul they can devote to cell site A 301 without negatively affecting customer experience on their own site. Cell site C 305 may determine that it is congested and informs server 308 the core network 307 via an X2 interface that it cannot provide backhaul resources. However, cell site B 303 has bandwidth and sends an acceptance to network server 308 via the X2 interface. Cell site A 301 starts sending out communication to cell site B 303 via the X2 interface and prepares to set up connection. After receiving acceptance, cell site A 301 sends final backhaul amount with necessary settings required, including spectrum to use, beam settings, and current RF conditions to cell site B 303. Cell site A 301 also tells network server 308 that it will be sending its traffic through cell site B 303 via beamforming. Cell site B 303 signals back to cell site A 301 that it is ready for transmission. Site A starts to transmit data (using beamforming transmission) over beam reserved with settings agreed upon. Data continues to be sent over the connection between cell site A 301 and cell site B 303 until cell site A 301 no longer requires the shared backhaul or cell site B 303 experiences an increase in traffic and is no longer able to share excess backhaul.

If cell site A 310 determines that it no longer requires a shared backhaul from cell site B 303, cell site A 301 will send a request to disconnect to cell site B 303 and notify the network server 308. Cell site A 301 would stop sending traffic to cell site B 303 but still listen for traffic from cell site B 303. Network server 308 receives disconnection requests from cell site A 301 and changes the configuration currently sending cell site A 301 traffic through cell site B 303. Cell site B 303 receives disconnection request from cell site A 301 and stops sending traffic to cell site A 303 and changes settings back to normal. Cell site B 303 sends acknowledgement to cell site A 301 saying they are now disconnected.

If cell site B 303 notices the traffic is increasing and that it requires to take backhaul back on the amount it is sharing with cell site A 301, cell site B 303 will notify cell site A 301 that can no longer support backhaul sharing with cell site A 301. Cell site A 301 receives notification from cell site B 303 and sense request to disconnect to cell site B 303 and notifies the network server 308. Cell site A 301 stops sending traffic to cell site B 303 but still listens for traffic from cell site B 303. Network server 308 receives disconnection request from cell site A 301 and changes configuration sending cell site A 301 traffic through cell site B 303. Cell site receives disconnection request from cell site A 301 and stop sending traffic to cell site A 301 and changes settings back to normal. Cell site B 303 cents in acknowledgment to cell site A 301 saying they are now disconnected. Cell site a 301 reevaluates backhaul utilization and if it continues to require additional backhaul then it reverts to beginning of process.

Figure 4:
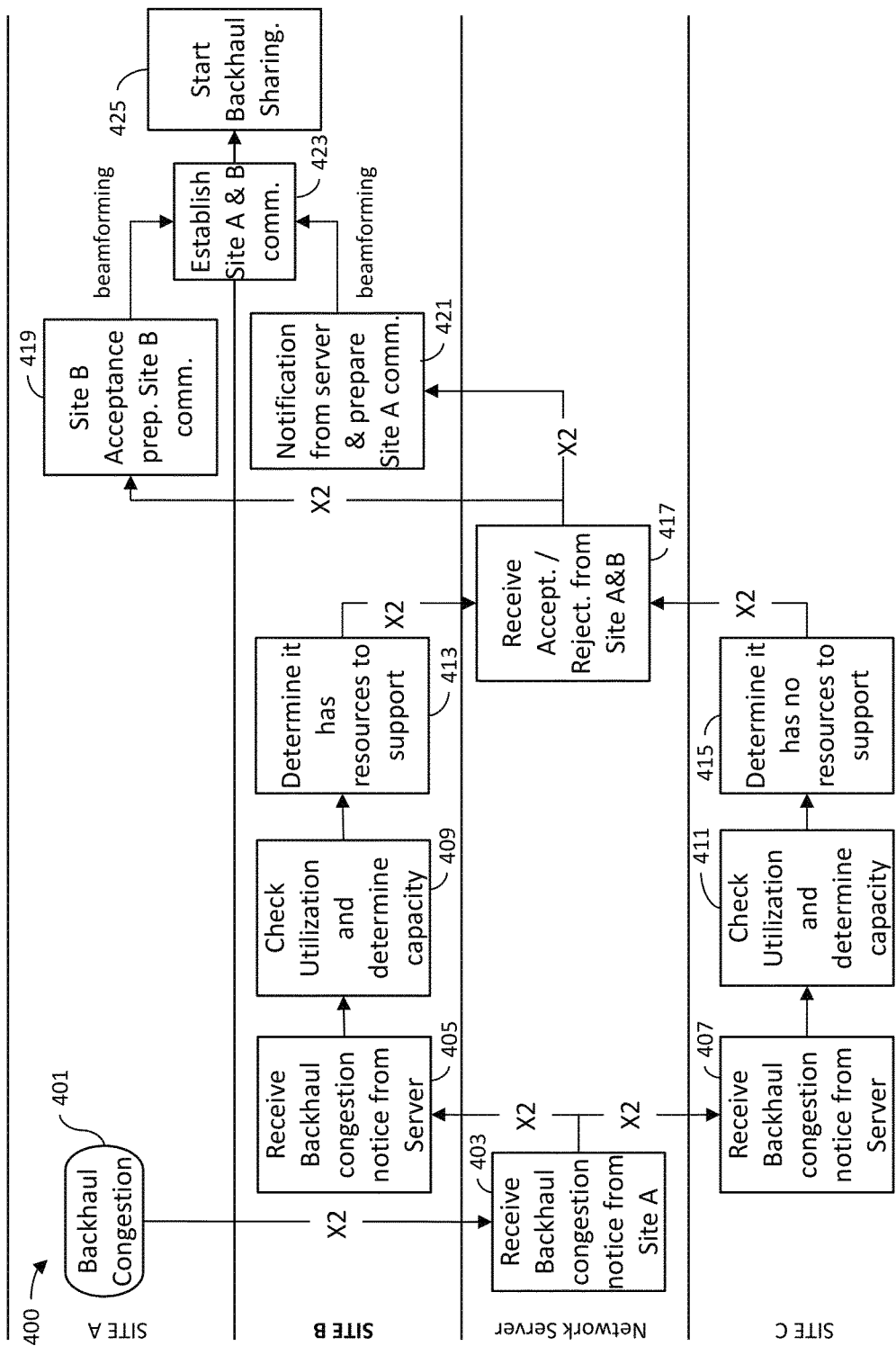
FIG. 4 is a flow chart of a method for improving data speed via backhaul sharing.

Illustrated in FIG. 4 is a flowchart for a method of improving data speed through backhaul sharing 400.

In step 401 the method 400 determines at cell site A 301 and it is experiencing high traffic and data speeds resulting in degradation due to backhaul becoming congested. Cell site A 301 will send a notice that its backhaul is congested by an extra protocol to the network server 308.

In step 403 the network server 308 receives the backhaul congestion notice from cell site A 301. The network server will then send a backhaul congestion notice to cell site B 303 and cell site C 305 via the X2 interface.

In step 405, cell site B 303 receives the backhaul congestion notice from server 308 via the X2 interface.

In step 407 cell site C 305 receives the backhaul congestion notice from server 308 via the X2 interface.

In step 409 cell site B 303 checks utilization and determines the backhaul capacity of the cell site B 303 backhaul network 311.

In step 411 cell site C 305 checks utilization and determines the backhaul capacity of the cell site C 305 backhaul network 311.

In step 413 cell site B 303 may determine that it has resources to support the capacity needs of cell site A 301 and communicates the determination to the network server 308 via an X2 interface.

In step 415 cell site C 305 may determine that it does not have the resources to support the capacity needs of cell site A 301 and communication determination to the network server 308 via an X2 interface.

In step 417 the network server 308 receives the determinations from cell site B 303 and cell site C 305 and develops and accept/reject instruction. The network server 308 sends an acceptance notice to cell site A 301 with instructions to prepare communications with cell site B 303. The network server 308 also sends notification to cell site B 303 with instructions to prepare communications with cell site A 301.

In step 419 cell site A 301 receives the cell site B 303 acceptance notification from the network server 308 and prepares to communicate with cell site B 303.

In step 421 cell site B 303 receives a notification from the server and prepares communication with cell site A 301.

In step 423 cell site A 301 and cell site B 303 establish communications through beamforming.

In step 425 cell site a 301 and cell site B 303 begin backhaul sharing of data.

Figure 5:
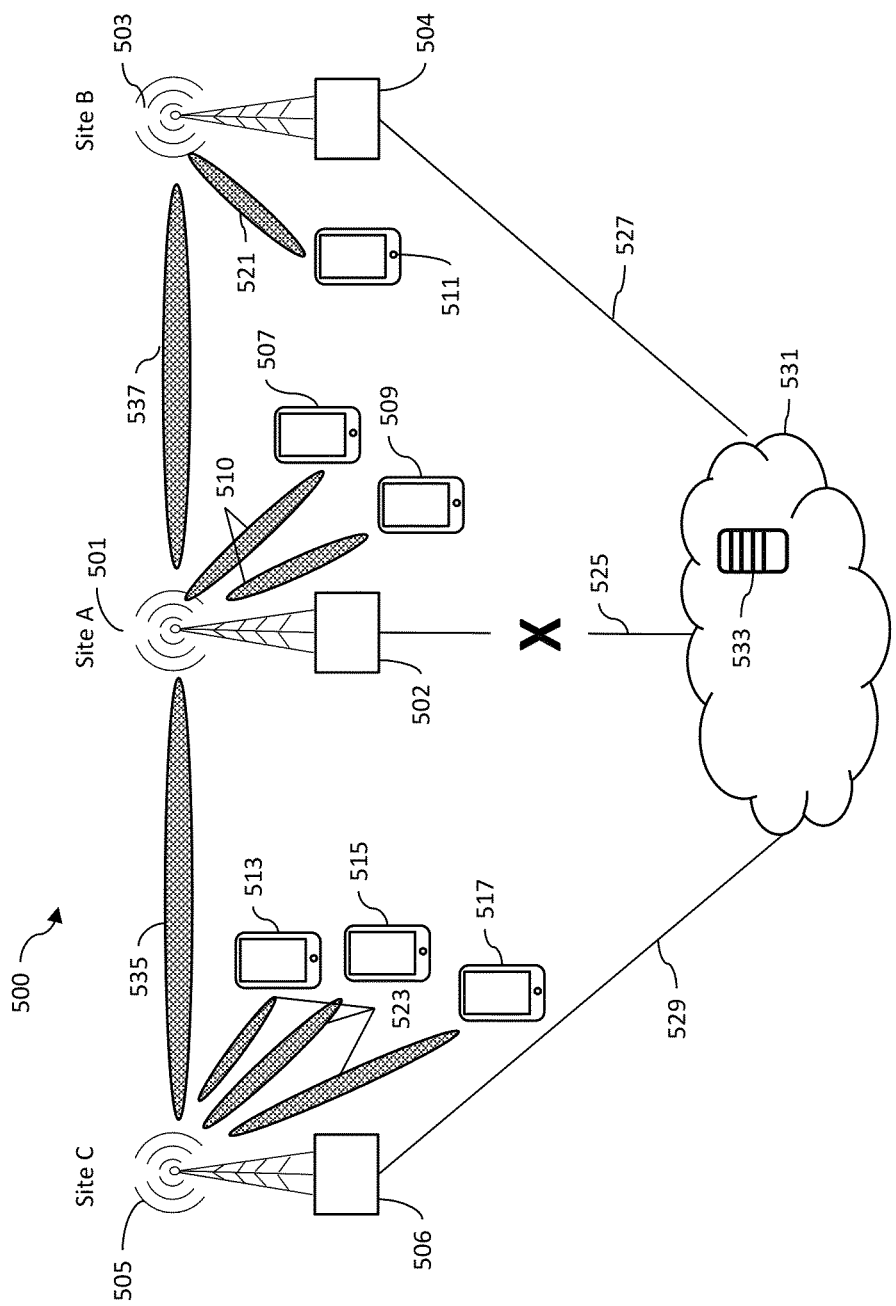
FIG. 5 is a schematic representation of a system for providing mobility site backhaul redundancy.

Illustrated in FIG. 5 is a system 500 for providing mobility site backhaul redundancy. When a site experiences backhaul disconnection (such as during a natural disaster or due to a fiber cut, equipment failure, etc.) there will be a network outage at that location and customers will be impacted. When backhaul sharing is implemented the site can continue to carry traffic even when backhaul is disconnected thereby avoiding the need to beef up transport and build expensive redundant links. The system 500 may include cell site A 501 having an eNodeB 502, cell site B 503 having an eNodeB 504 and cell site C 505 having an eNodeB 506. Cell site A 501 may support a plurality of UE's such as for example UE 507 and UE 509 through standard wireless transmission 510. Cell site B 503 may support a plurality of UEs such as for example UE 511 through standard wireless transmission 521. Cell site C 505 may support a plurality of UEs such as for example UE 513, UE 515 and UE 517 through standard wireless transmission 523. Cell site A 501 may be connected to backhaul network 525. Cell site B 503 may be connected to backhaul network 527. Cell site C 505 may be connected to this backhaul network 529. Backhaul network 525, backhaul network 527 and backhaul network 529 are connected to the core network 531 comprising a network server 533. Cell site A 501 and cell site C 505 may communicate via beamforming transmission 535. Cell site A 501 and cell site B 503 may communicate via beamforming transmission 537.

The system 500 providing mobility site backhaul redundancy would operate as follows. If cell site A 501 experiences a backhaul disconnection due to natural disaster, fiber cut, equipment failure etc., the network server 533 would notice that cell site A 501 has lost this backhaul connection and will send out a warning to other sites notifying them of a nearby site becoming disconnected. Cell site B 503 and cell site C 505 would send out a distress message using concentrated beamforming in direction of disconnected sell site A 501, while also listening for a response. Surrounding sites are aware of neighbor locations and can set up predetermined beam parameters at time of site commissioning. Cell site A 501 receives a message from cell site B 503 and cell site C 505 requesting to help with RF beamforming settings and backhaul settings. Cell site A 501 compares different requests for help and chooses best candidate. In the example of FIG. 5 cell site A 501 may choose cell site B 503 as the best candidate and sends sharing request with applicable RF beamforming settings and network parameters. Cell site B 503 receives sharing requests and applies applicable settings for beamforming and backhaul sharing. Cell site B 503 notifies network server 533 that cell site A 501 will now send all traffic through cell site B 503. Cell site B 503 notifies cell site A 501 that is ready for traffic from cell site A 501. Cell site A 501 starts sending traffic through cell site B 503. The network server 533 notifies surrounding mobility sites that cell site A 501 has found a backhaul sharing partner and notifies them to stop searching for cell site A 501. Surrounding mobility sites stop searching for cell site A 501. Cell site A 501 continues to send traffic through cell site B 503 until cell site A 501 has restored its backhaul network 525. Cell site A 501 receives restored backhaul connection and notifies cell site B 503 that it no longer requires backhaul sharing from cell site B 503 and requests disconnection. Cell site B 503 sends disconnection notification to cell site A 501 and resets settings back to normal. Cell site B 503 notifies network server 533 that cell site A 501 has restored connection and will no longer be coming through cell site B 503. Thereafter, cell site A 501 and cell site B 503 operate as normal.

Figure 6:
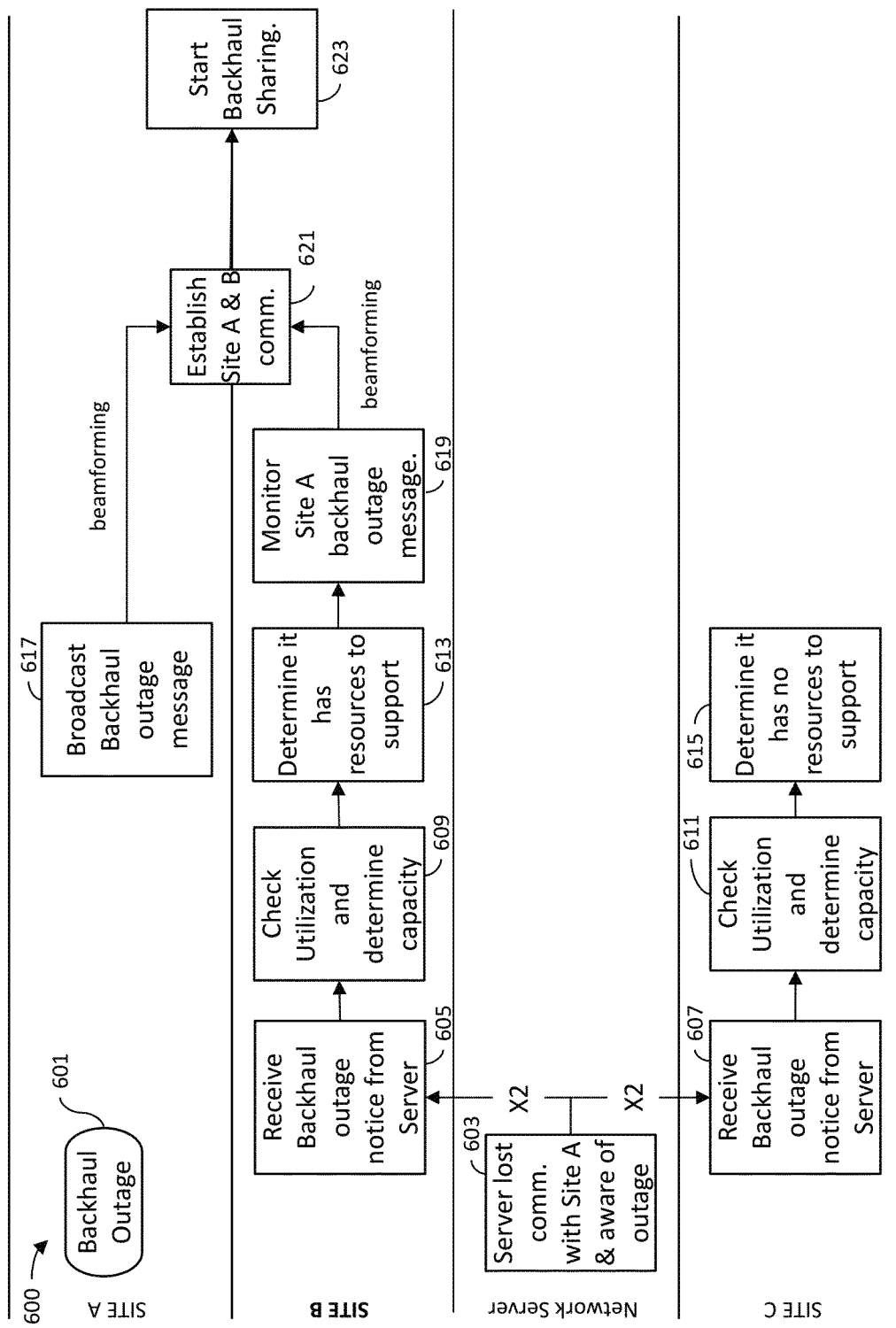
FIG. 6 is a flowchart of a method for providing mobility site backhaul redundancy.

FIG. 6 is a flowchart of a method 600 for providing mobility site backhaul redundancy.

In step 601 cell site A 501 experiences a backhaul outage event.

In step 603 the network server 533 detects a loss of communication with cell site A 501 and sends out a backhaul outage notice to sell site B 503 and cell site C 505.

In step 605 cell site B 503 receives the backhaul outage notice from the network server 533 through an X2 interface.

In step 607 cell site C 505 receives the backhaul outage notice from the network server 533 through an X2 interface.

In step 609 cell site B 503 checks utilization and determines the available capacity of its backhaul network 527.

In step 611 cell site C 505 checks utilization and determines the available capacity of its backhaul network 529.

In step 613 cell site B 503 may determine that it has the resources to support the backhaul needs of cell site A 501.

In step 615 cell site C 505 may determine that it does not have the resources to support the backhaul needs of cell site A 501.

In step 617 cell site A 501 broadcasts a backhaul outage distress message

In step 619 cell site B 503 monitors the cell site A 501 backhaul outage distress message.

In step 621 cell site A 501 and cell site B 503 establish communication through beamforming transmissions.

In step 623 cell site A 501 and cell site B 503 begins backhaul sharing.

Figure 7:
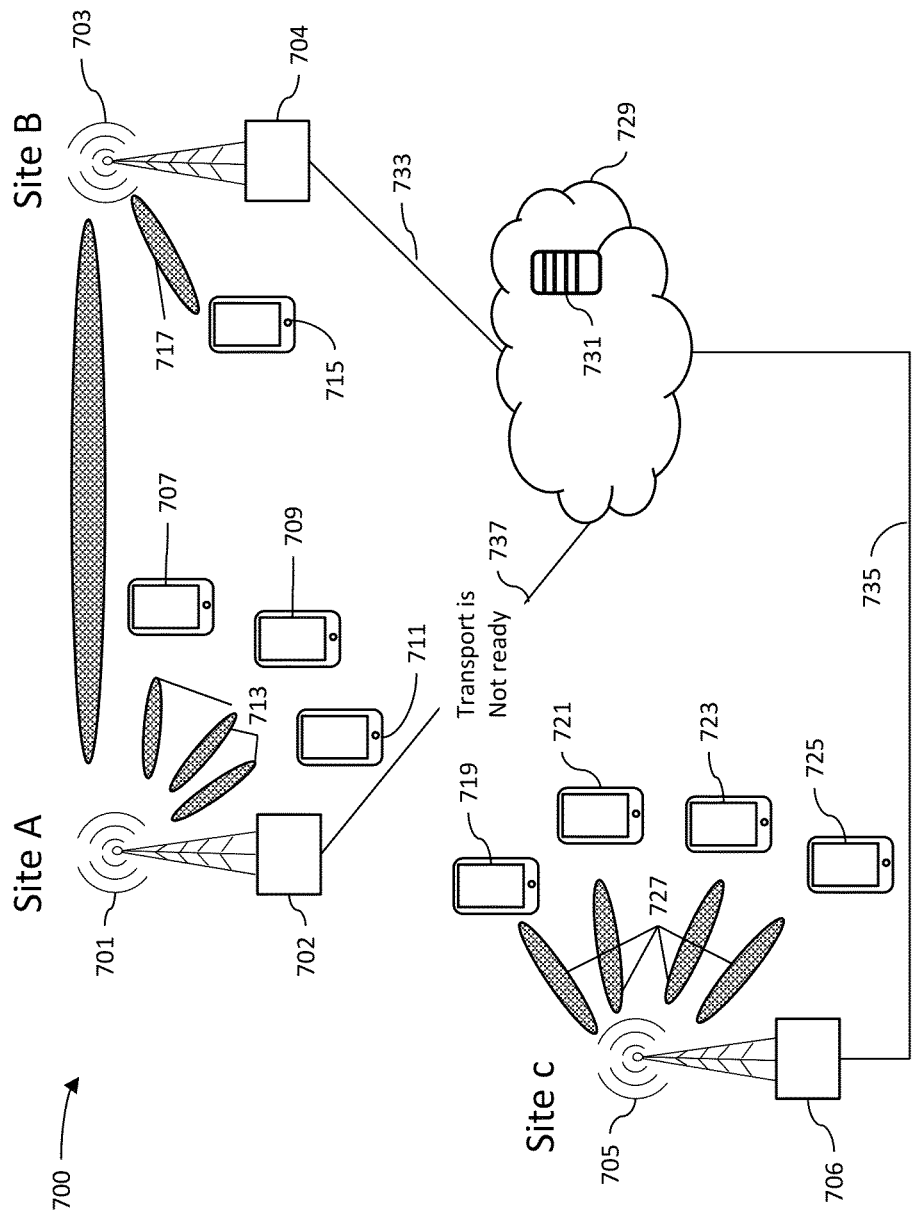
FIG. 7 is a schematic representation of a system for providing faster backhaul connections.

Illustrated in FIG. 7 is a system 700 for quick backhaul connections for new sites and cell on wheels ("COW") and cell on light truck ("COLT). For new site builds, backhaul connection often takes months to be set up especially where network operator does not own the transport infrastructure and needs to connect to a 3rd party's system. Backhaul sharing will provide a temporary backhaul connection and the site can start transmitting immediately while a permanent backhaul connection is set up. Backhaul sharing can also be an excellent way to provide temporary connection for COW/COLT deployment.

The system 700 may include a cell site A 701 with an associated eNodeB 702, a cell site B 703 with an associated eNodeB 704 and a cell site C 705 with an associated eNodeB 706. Cell site A 701 may support a plurality of UEs, such as for example UE 707, UE 709 and UE 711 through standard wireless transmissions 713. Cell site B 703 may support a plurality of UEs such as for example UE 715 through standard wireless transmission 717. Cell site C 705 may support a plurality of UEs such as for example UE 719, UE 721, UE 723, and UE 725 through standard wireless transmissions 727. Cell site B 703 and Cell site C 705 are connected to a core network 728 (with a network server 731) through backhaul connections 733 and 735 respectively. In the case of cell site A 701, the backhaul network 737 is not active or not yet ready.

The system 700 would operate as follows. A new site (cell site A 701) deployed for business as usual process or network enhancements or restoration is deployed. Cell site A 701 comes online and sends out backhaul sharing requests to surrounding Sites. Cell site B 703 and cell site C 705 receive requests and send back RF beamforming and backhaul parameters to cell site A 701. Examples of beam forming parameters include signal-to-interference-plus-noise ratio (SINR) (i.e. RF condition) and the number of physical resource blocks (PRBs) and multiple-input and multiple-output (MIMO) layers/beams available (air interface availability). Examples of backhaul parameters include maximum backhaul capacity, current backhaul channel utilization and maximum backhaul capacity that can be shared. Cell site A 701 compares information for surrounding sites and chooses best option. For example, cell site A 701 may choose cell site B 703 for backhaul sharing and sends beamforming and other network information to cell site B 703 for setup. Cell site B 703 receives information from cell site A 701 and sets beamforming and network parameters to accept traffic from cell site A 701 and tells cell site A 701 that cell site B 703 is ready for traffic. Cell site B 703 tells network server 731 that traffic from cell site A 701 is now routing through cell site B 703. Cell site A 701 receives information from cell site B 703 and begins sending traffic through cell site B 703. Cell site A 701 continues to send traffic through cell site B 703 until it receives backhaul of its own or is no longer needed for network enhancements or emergency. In that case, cell site A 701 tells cell site B 703 it no longer requires backhaul sharing from cell site B 703 and requests disconnect. The, cell site B 703 tells network server 733 that cell site A 701 will no longer be sending traffic through cell site B 703. Cell site B 703 sends a disconnect signal to cell site A 701 and no longer sends traffic to cell site A 701. Cell site A 701 receives the disconnect signal from cell site B 703 and ceases to send traffic to cell site B 703.

Figure 8:
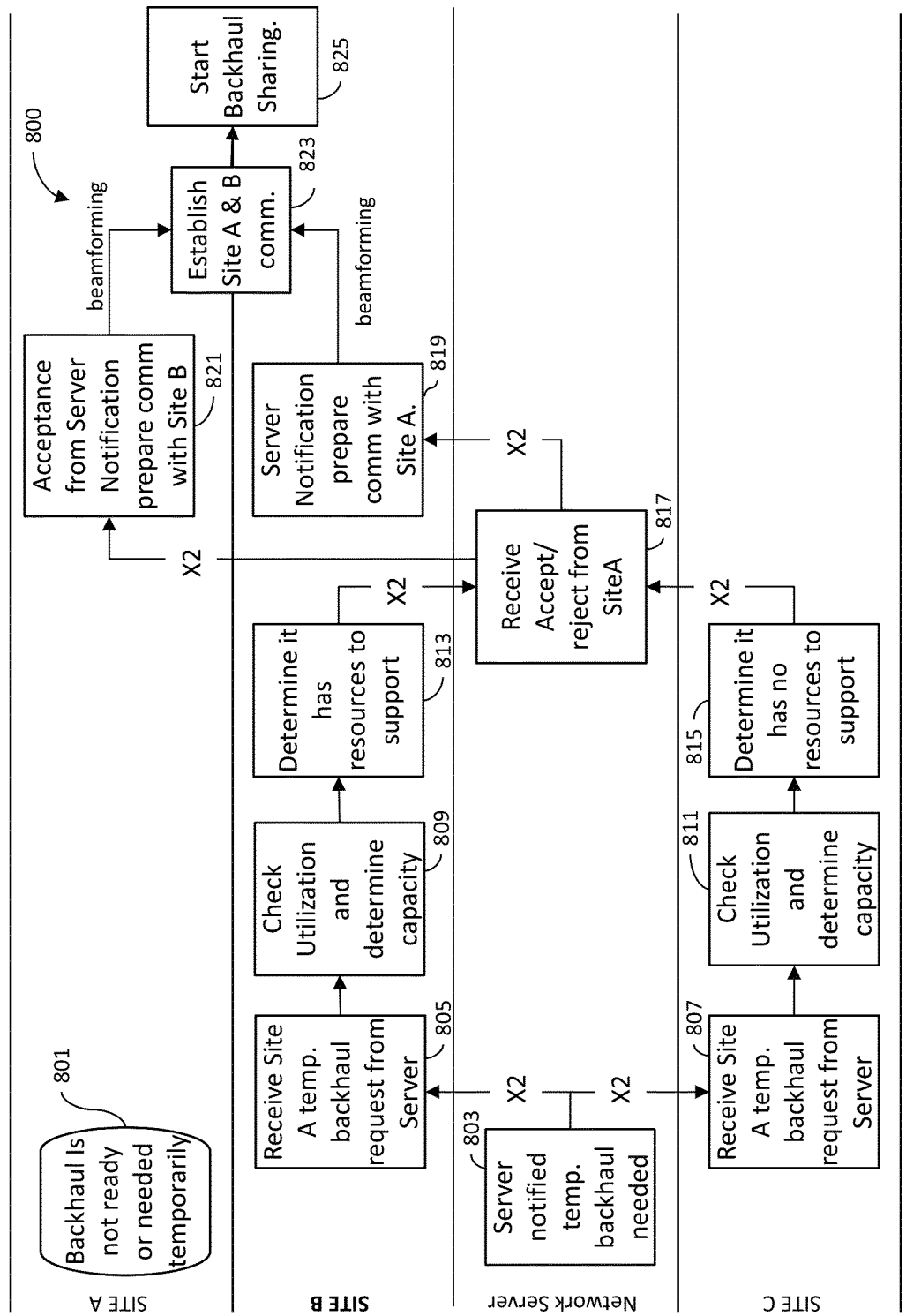
FIG. 8 is a flowchart of a method for providing faster backhaul connections.

FIG. 8 is a flowchart of a method for providing temporary backhaul 800.

In step 801, a new cell site A 701 is deployed.

In step 803 the network server 733 is notified that a temporary backhaul is required.

In step 805 cell site B 703 receives a temporary backhaul request for cell site A 701 from the network server 733.

In step 807 cell site C 705 receives a temporary backhaul request for cell site A 701 from the network server 733.

In step 809 cell site B 703 checks utilization and determines whether there is capacity available for handling cell site A 701 traffic.

In step 811 cell site C 705 checks utilization and determines whether there is capacity available for handling cell site A 701 traffic.

In step 813, cell site B 703 may determine that it has capacity to support the traffic from cell site A 701.

In step 815, cell site C 705 may determine that it does not have capacity to support the traffic from cell site A 701.

In step 817, the network server receives availability/capacity communication from cell site B 703 and cell site C 705, determines which site will be connected to cell site A 701 and sends notification though an X2 interface to cell site A 701 and cell site B 703 to establish communication between the sites.

In step 819 cell site B 703 receives the notification from the network server 733 to prepare communication with cell site A 701.

In step 821 cell site A 701 receives the notification from the network server 733 to prepare communication with cell site B 703.

In step 823 cell site a 701 and cell site B 703 establish communication though beamforming transmission.

In step 825 cell site A 701 and cell site B 703 begin backhaul sharing.

In another embodiment, UE data enters cell site A 701 through normal RF systems. Baseband units send data to a Smart Integrated Access Devices (SIADs) through normal RF systems. SIADs distribute data between current backhaul and beamformed backhaul. Data over beamformed backhaul travels back to base band unit (BBU) for distribution of beamformed channel to cell site B 703. Cell site B 703 receives data from cell site A 701 over beamformed channel and handles it similar to UE data on cell site B 703. Data is sent to network over bearer established by cell site A 701.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a non-transitory computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" is used herein to mean serving as an instance or illustration. Any embodiment or design described herein as an "example" is not necessarily to be construed as preferred or advantageous over other embodiments or designs. Rather, use of the word example is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed:

1. A method comprising:
  accessing a first cell site that is able to service a data transmission having a first data rate wherein the first cell site is connected to a first backhaul network having a first backhaul data rate;
  determining if the first data rate exceeds the first backhaul data rate;
  determining an excess data rate comprising an amount that the first data rate exceeds the first backhaul data rate;
  coordinating with a first neighboring cell site having a second backhaul network to determine a first amount of additional capacity the second backhaul network can handle based on availability of the second backhaul network and beamforming conditions between the first cell site and the first neighboring cell site;
  initiating backhaul sharing using beamforming between the first cell site and the first neighboring cell site to transmit data according to the first amount of additional capacity from the first cell site to the first neighboring cell site;
  determining that the second backhaul network no longer has the first amount of additional capacity;
  coordinating with a second neighboring cell site having a third backhaul network to determine a second amount of additional capacity the third backhaul network can handle based on availability of the third backhaul network and beamforming conditions between the first cell site and the second neighboring cell site; and
  initiating backhaul sharing using beamforming between the first cell site and the second neighboring cell site to transmit data according to the second amount of additional capacity from the first cell site to the second neighboring cell site.

2. The method of claim 1, wherein the coordinating with the first neighboring cell site having the second backhaul network to determine the first amount of additional capacity the second backhaul network can handle comprises the coordinating via an X2 interface.

3. The method of claim 1, wherein the accessing the first cell site comprises accessing an antenna array that supports multi-user beamforming.

4. The method of claim 1, wherein the initiating backhaul sharing using beamforming between the first cell site and the first neighboring cell site comprises transmitting a portion of the data transmission to the first neighboring cell site using beamforming transmission.

5. The method of claim 4, wherein the transmitting the portion of the data transmission to the first neighboring cell site using beamforming transmission comprises using pre-determined beam parameters set up at time of site commissioning.

6. The method of claim 1, wherein the initiating backhaul sharing using beamforming between the first cell site and the second neighboring cell site comprises transmitting a portion of the data transmission to the second neighboring cell site using beamforming transmission.

7. The method of claim 6, wherein the transmitting the portion of the data transmission to the second neighboring cell site using beamforming transmission comprises using pre-determined beam parameters set up at time of site commissioning.

8. A system comprising:
  a first cell site having a first antenna array capable of transmitting beam forming transmissions;
  a first backhaul network associated with the first cell site capable of transmitting backhaul data at a first backhaul data rate;
  a second cell site having a second antenna array capable of transmitting beam forming transmissions;
  a second backhaul network associated with the second cell site capable of transmitting backhaul data at a second backhaul data rate;
  a third cell site having a third antenna array capable of transmitting beam forming transmissions;
  a third backhaul network associated with the third cell site capable of transmitting backhaul data at a third backhaul data rate;
  a user equipment that transmits a data transmission to the first cell site at a first data rate;
  a processor;
  a non-transitory, non-volatile computer memory for storing computer instruction coupled to
    the processor, wherein the processor, responsive to executing the computer instructions, performs operations comprising:
    accessing the first cell site;

determining if the first data rate exceeds the first backhaul data rate;
determining an excess data rate comprising an amount that the first data rate exceeds the first backhaul data rate;
coordinating with the second cell site to determine a first amount of additional capacity the second backhaul network can handle based on availability of the second backhaul network and beamforming conditions between the first cell site and the second cell site;
initiating backhaul sharing using beamforming between the first cell site and the second cell site to transmit data according to the first amount of additional capacity from the first cell site to the second cell site;
determining that the second backhaul network no longer has the first amount of additional capacity;
coordinating with the third cell site to determine a second amount of additional capacity the third backhaul network can handle based on availability of the third backhaul network and beamforming conditions between the first cell site and the third cell site; and
initiating backhaul sharing using beamforming between the first cell site and the third cell site to transmit data according to the second amount of additional capacity from the first cell site to the third cell site.

9. The system of claim 8, wherein the first antenna array supports multi-user beamforming.

10. The system of claim 8, wherein the second cell site is configured to act as a user equipment and receive a beamforming transmission.

11. The system of claim 8, wherein the coordinating with the second cell site having the second backhaul network to determine the first amount of additional capacity the second backhaul network can handle comprises the coordinating via an X2 interface.

12. The system of claim 8, wherein the initiating backhaul sharing using beamforming between the first cell site and the first neighboring cell site comprises transmitting a portion of the data transmission to the first neighboring cell site using beamforming transmission.

13. The system of claim 8, further comprising a plurality of neighboring cell sites each having an antenna array capable of transmitting beam forming transmissions.

14. The system of claim 13, wherein the operations performed by the processor further comprise distributing the data transmission among the plurality of neighboring cell sites when the first backhaul data rate is zero.

15. A non-transitory, tangible computer-readable medium having computer-executable instructions stored thereon which, when executed by a computer, cause the computer to perform a method for improving data throughput via backhaul sharing comprising:
accessing a first cell site that is able to service a data transmission having a first data rate wherein the first cell site is connected to a first backhaul network having a first backhaul data rate;
determining if the first data rate exceeds the first backhaul data rate;
determining an excess data rate comprising an amount that the first data rate exceeds the first backhaul data rate;
coordinating with a first neighboring cell site having a second backhaul network to determine a first amount of additional capacity the second backhaul network can handle based on availability of the second backhaul network and beamforming conditions between the first cell site and the first neighboring cell site;
initiating backhaul sharing using beamforming between the first cell site and the first neighboring cell site to transmit data according to the first amount of additional capacity from the first cell site to the first neighboring cell site;
determining that the second backhaul network no longer has the first amount of additional capacity;
coordinating with a second neighboring cell site having a third backhaul network to determine a second amount of additional capacity the third backhaul network can handle based on availability of the third backhaul network and beamforming conditions between the first cell site and the second neighboring cell site; and
initiating backhaul sharing using beamforming between the first cell site and the second neighboring cell site to transmit data according to the second amount of additional capacity from the first cell site to the second neighboring cell site.

16. The non-transitory, tangible computer-readable medium of claim 15, wherein the computer-executable instructions stored thereon which, when executed by the computer, cause the computer to perform the method for improving data throughput via backhaul sharing wherein the coordinating with the first neighboring cell site having the second backhaul network to determine the first amount of additional capacity the second backhaul network can handle comprises the coordinating via an X2 interface.

17. The non-transitory, tangible computer-readable medium of claim 15, wherein the computer-executable instructions stored thereon which, when executed by the computer, cause the computer to perform the method for improving data throughput via backhaul sharing wherein the accessing the first cell site comprises accessing an antenna array that supports multi-user beamforming.

18. The non-transitory, tangible computer-readable medium of claim 15, wherein the computer-executable instructions stored thereon which, when executed by the computer, cause the computer to perform-a the method for improving data throughput via backhaul sharing, wherein the initiating backhaul sharing using the beamforming between the first cell site and the first neighboring cell site comprises transmitting a portion of the data transmission to the first neighboring cell site using beamforming transmission.

19. The non-transitory, tangible computer-readable medium of claim 18, wherein the computer-executable instructions stored thereon which, when executed by the computer, cause the computer to perform the method for improving data throughput via backhaul sharing, wherein the transmitting the portion of the data transmission to the first neighboring cell site using beamforming transmission comprises using pre-determined beam parameters set up at time of site commissioning.

20. The non-transitory, tangible computer-readable medium of claim 15, wherein the computer-executable instructions stored thereon which, when executed by the computer, cause the computer to perform the method for improving data throughput via backhaul sharing, further comprising coordinating with a plurality of neighboring sites when the first data rate exceeds the first backhaul data rate.

* * * * *